United States Patent [19]

Ohta

[11] Patent Number: 4,789,230

[45] Date of Patent: Dec. 6, 1988

[54] F-θ LENS FOR USE IN A LIGHT BEAM SCANNING DEVICE

[75] Inventor: Akira Ohta, Iwatsuki, Japan

[73] Assignee: Fuji Xerox Co., Ltd., Japan

[21] Appl. No.: 157,296

[22] Filed: Feb. 17, 1988

[30] Foreign Application Priority Data

Feb. 20, 1987 [JP] Japan ................... 62-37042

[51] Int. Cl.$^4$ .................. G02B 9/04; G02B 9/06; G02B 26/10
[52] U.S. Cl. ..................... 350/480; 350/6.1; 350/6.8; 350/479
[58] Field of Search ............... 350/6.1, 6.8, 479, 480

[56] References Cited

U.S. PATENT DOCUMENTS

| | | | |
|---|---|---|---|
| 3,973,833 | 8/1976 | Lawson | 350/6.8 X |
| 4,179,183 | 12/1979 | Tateoka et al. | 350/479 X |
| 4,277,128 | 7/1981 | Kawamura | 350/6.8 |
| 4,343,531 | 8/1982 | Tateoka et al. | 350/479 X |
| 4,512,625 | 4/1985 | Brueggemann | 350/6.8 |
| 4,571,035 | 2/1986 | Sakuma | 350/6.8 X |
| 4,645,311 | 2/1987 | Rothe | 350/480 X |
| 4,707,085 | 11/1987 | Takanashi et al. | 350/480 |
| 4,712,884 | 12/1987 | Sakuma et al. | 350/6.8 X |

FOREIGN PATENT DOCUMENTS

| | | |
|---|---|---|
| 53-137631 | 12/1978 | Japan . |
| 55-127514 | 10/1980 | Japan . |
| 55-149916 | 11/1980 | Japan . |
| 61-172109 | 8/1986 | Japan . |
| 61-175607 | 8/1986 | Japan . |
| 61-48684 | 10/1986 | Japan . |

Primary Examiner—John K. Corbin
Assistant Examiner—Scott J. Sugarman
Attorney, Agent, or Firm—Welsh & Katz, Ltd.

[57] ABSTRACT

An fθ lens for use in a light beam scanning device is constituted by a meniscus lens having a small power and located on the side of a deflection point, and a plano-convex lens having a large power and disposed with its convex surface on the side of a surface to be scanned. The lenses are constructed to satisfy the following conditions:

$$-0.3 \leq f/f_1 \leq 0.2 \quad \text{(a)}$$

$$-0.6/f_1 + 0.85/f \leq 1/f_2 \leq -0.6/f_1 + 0.95/f \quad \text{(b)}$$

where f represents a focal length of a lens system constituted by the two lenses, and $f_1$ and $f_2$ respectively represent focal lengths of the meniscus lens and the plano-convex lens.

1 Claim, 5 Drawing Sheets

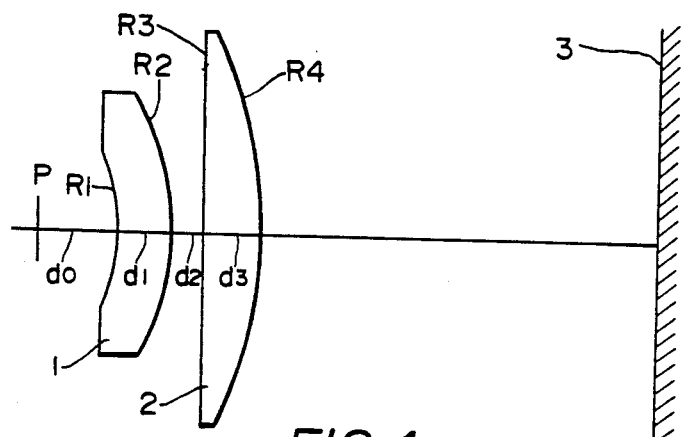
FIG. 1
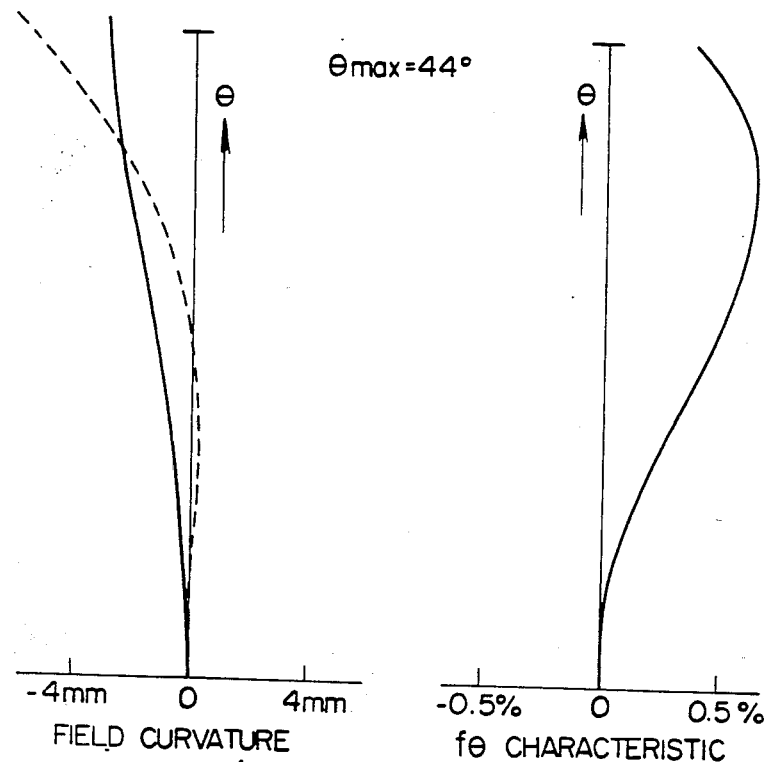
FIG. 2(a)  FIELD CURVATURE
FIG. 2(b)  fθ CHARACTERISTIC

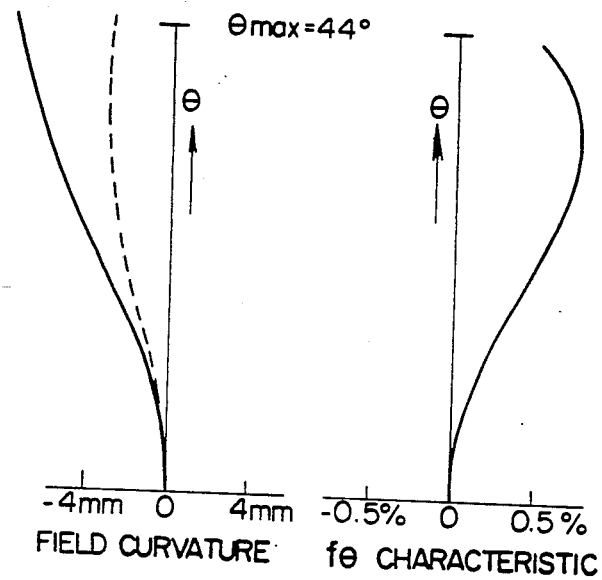
FIG.7(a) FIELD CURVATURE   FIG.7(b) fθ CHARACTERISTIC
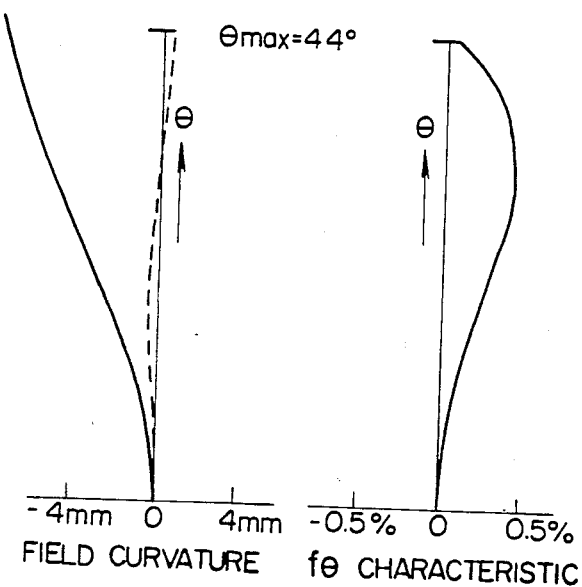
FIG.8(a) FIELD CURVATURE   FIG.8(b) fθ CHARACTERISTIC

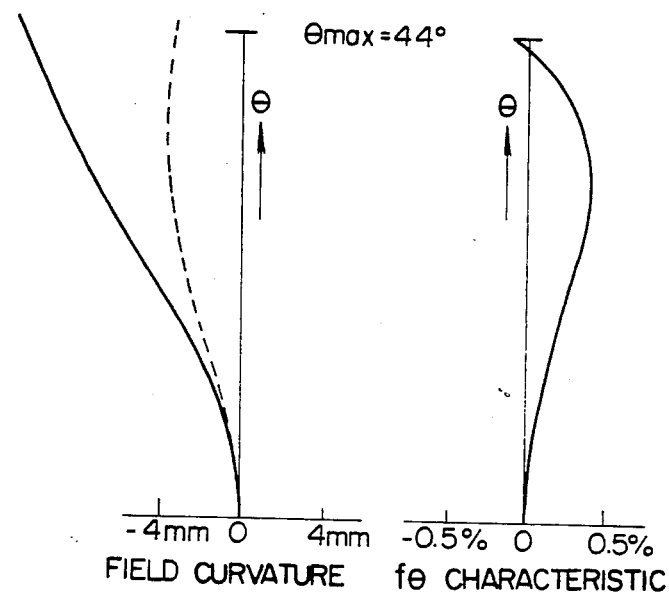
FIG.9(a) FIELD CURVATURE
FIG.9(b) fθ CHARACTERISTIC
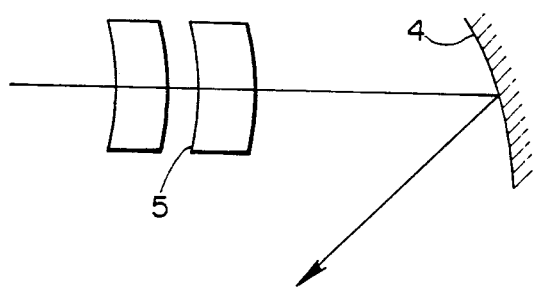
FIG.10

F-θ LENS FOR USE IN A LIGHT BEAM SCANNING DEVICE

BACKGROUND OF THE INVENTION

This invention relates to a light beam scanning apparatus utilized in a picture image forming apparatus such as a laser printer, a digital copying machine or the like, and more particularly to an improvement of an fθ lens for use in a light beam scanning device.

A picture image forming apparatus generally comprises modulating means such as a ultrasonic wave light modulator which modulates a laser beam generated by a laser oscillator to form a picture signal, and a light beam scanning device comprising deflector means such as a rotary polygonal mirror which deflects the modulated laser beam at a constant angular speed, and a lens system adapted to focus, the deflected laser beam on a scanned surface of a photosensitive member.

In such a light beam focusing device, so-called fθ lens is widely used as the lens system. The fθ lens is used for the purpose of correcting the deflection of the laser beam deflected by deflecting means such as the rotary polygonal mirror so as to make equal the scanning speed of the spot of the focused laser beam. The term fθ lens is named by the fact that the laser beam incident to the lens from a deflection point at an angle of θ with respect to the optical axis of the lens is focused to a position f×θ spaced from the optical axis the lens having a focal length of f.

Various types of the fθ lens have been proposed. For example, Japanese laid open patent application No. 137631/1978 discloses a type made of a combination of lenses having negative and positive powers, Japanese laid open patent application No. 172109/1986 discloses another type made of a combination of lenses having positive and positive powers, and Japanese published patent application No. 496884/1986 discloses still another type made of a single lens.

In the fθ lens comprising a combination of lenses having negative and positive powers as disclosed in Japanese laid open patent specification No. 137631/1978, since the negative power is large, the back focal distance is long with the result that the light path length between the fθ lens and the scanned surface becomes long. Thus, it is difficult to make the light beam scanning compact. On the other hand, in the fθ lens comprising a combination of two lenses of positive power as disclosed in Japanese laid open patent application Nos. 172109/1986 and 175607/1986, since the lens located closer to the deflection point, at which the beam is deflected, has a stronger power and since the two lenses are located at relatively remote positions from the deflection point, the sizes of two lenses become large. This also makes it difficult to make compact the light beam scanning device. Moreover, the fθ lens made of a single lens as disclosed in Japanese published patent application No. 48684/86 has a small range of deflection angle so that it is difficult to provide a wide picture angle. For this reason, a considerably long light path length is necessary to obtain a desired scanning range. This also makes it difficult to miniaturize the light beam scanning devices.

SUMMARY OF THE INVENTION

Accordingly, it is an object of this invention to provide a novel fθ lens for use in a light beam scanning device capable of providing a large effective deflection angle and yet capable of decreasing the light path length between the deflection point and the surface to be scanned as well as the size of the lens so as to obtain a compact light beam scanning device.

Another object of this invention is to provide a novel fθ lens for use in a light beam scanning device capable of providing a large effective deflection angle and yet capable of improving field curvature characteristic and fθ characteristic.

A further object of this invention is to provide an improved fθ lens for use in a light beam scanning device capable of readily providing an wobble compensation optical system for compensating for the wobble as well as the the field curvature.

According to this invention there is provided an f lens for use in a light beam scanning device having a lens system for focusing on a surface to be scanned a light beam deflected by deflection means, the fθ lens comprising a meniscus lens having a small power and located on the side of a deflection point of the deflection means, and a plano-convex lens having a large power and disposed with its convex surface on the side of the surface to be scanned, the lenses being constructed to satisfy the following conditions $$-0.3 \leq f/f_1 \leq 0.2 \quad (a)$$

$$-0.6/f_1 + 0.85/f \leq 1/f_2$$

$$1/f_2 \leq -0.6/f_1 + 0.95/f \quad (b)$$

where f represent a focal length of combination of the two lenses, and $f_1$ and $f_2$ respectively represent focal lengths of the meniscus lens and the plano-convex lens.

BRIEF DESCRIPTION OF THE DRAWINGS

In the accompanying drawings:

FIG. 1 is a diagrammatic side view showing one embodiment of the fθ lens according to this invention;

FIGS. 2a, 2b; 3a, 3b; 4a, 4b; 5a, 5b; 6a, 6b; 7a, 7b; 8a, 8b; and 9a, 9b are graphs respectively showing field curvature and fθ characteristics when parameters such as the distance between lens surfaces are varied; and FIG. 10 is a diagrammatic representation of an wobble compensating optical system.

DESCRIPTION OF THE PREFERRED EMBODIMENTS

Figures 3A, 3B:
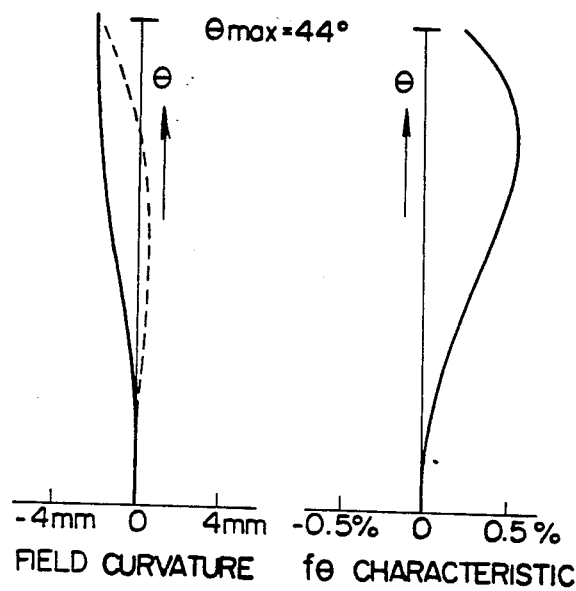

One embodiment of an fθ lens of this invention shown in FIG. 1 comprises a meniscus lens 1 having a small power and disposed on the side of a deflection point P, and a plano-convex lens 2 having a large power with its convex side faced to a plane 3 to be scanned. When the focal lengths of the lenses 1 and 2 are represented by $f_1$ and $f_2$ and when the focal length of a lens system constituted by these lenses is represented by f, the fθ lens of this invention is constructed to satisfy the following conditions (a) and (b):

$$-0.3 \leq f/f_1 \leq 0.2 \quad (a)$$

$$-0.6/f_1 + 0.85/f \leq 1/f_2$$

$$1/f_2 \leq -0.6/f_1 + 0.95/f \quad (b)$$

As is well known in the art, the characteristic of the fθ lens is determined by taking mainly into consideration the field curvature and the fθ characteristic. When the field curvature varies greatly, the spot diameter of a light beam focused on a surface to be scanned varies from point to point and therefore the resolution of the light scanning degrades. On the other hand, when the variation of the $f\theta$ characteristic is large, the scanning speed of the light beam on the surface to be scanned varies, and the picture image when reproduced, is distorted.

The inventor of this application has made many investigations for improving the field curvature and the $f\theta$ characteristics and has determined conditions (a) and (b) described above. When value of $f/f_1$ exceeds the upper limit of condition (a) there is a disadvantage that the negative distortion aberration becomes small, whereas when value of $f/f_1$ becomes less than the lower limit, the field curvature in the tangential plane shifts toward the lens. Further, when value of $-0.6/f_1+0.85/f$ exceeds the upper limit of condition (b), the field curvature in the tangential plane shifts toward the lens, whereas when value of $-0.6/f_1+0.95/f$ becomes less than the lower limit, the negative distortion aberration becomes small, which is also undesirable.

Even when the field curvature in a sagittal plane is considerably large, such curvature does not cause serious problems because it can be readily removed by using an additional optical system of a known wobble compensating optical system.

In the $f\theta$ lens shown in FIG. 1, let us denote the distances between adjacent lens surfaces respectively by d1, d2 and d3 in the order from the deflection point P, the distance between the deflection point P and the meniscus lens 1 by d0, the radius of curvatures of respective lens surfaces by R1, R2, R3 and R4 respectively, the refractive indices of the materials of respective lenses by N1 and N2. The followings are examples in which the focal length f of the lens system, as a whole, is 100 (f=100), the laser beam has a wavelength of 780 nm, and the picture angle $\theta$max is equal to 44°.

EXAMPLE 1

| f = 100, | 1/f1 = −0.003, | 1/f2 = 0.0108 |
|---|---|---|
| | d0 = 8.57 | |
| R1 = −17.071, | d1 = 8.57, | N1 = 1.51 |
| R2 = −22.194, | d2 = 4.29 | |
| R3 = ∞, | d3 = 10.71, | N2 = 1.51 |
| R4 = −47.222 | | |

FIGS. 2a and 2b show the field curvature and the $f\theta$ characteristic of example 1. In FIG. 2a, a broken line shows the curvature of the image surface in the tangential plane while a solid line shows the field curvature in a sagittal plane. FIG. 2b shows the $f\theta$ characteristic, which is obtained by the calculation of $[(h-f\theta)/f\theta]\times 100\%$, in other words, deviations from the ideal $f\theta$ condition in %, where h represents image height and $\theta$ represents deviation angle.

EXAMPLE 2

| f = 100, | 1/f1 = −0.002, | 1/f2 = 0.0102 |
|---|---|---|
| | d0 = 8.57 | |
| R1 = −18.724, | d1 = 8.57, | N1 = 1.51 |
| R2 = −23.332, | d2 = 4.29 | |
| R3 = ∞ | d3 = 10.71, | N2 = 1.61, |
| R4 = −59.804 | | |

FIGS. 3a and 3b show the field curvature and the $f\theta$ characteristic of example 2.

EXAMPLE 3

| f = 100, | 1/f1 = −0.001, | 1/f2 = 0.0096 |
|---|---|---|
| | d0 = 8.57 | |
| R1 = −21.396, | d1 = 8.57, | N1 = 1.51 |
| R2 = −25.355,. | d2 = 4.29 | |
| R3 = ∞ | d3 = 10.71, | N2 = 1.71 |
| R4 = −73.958 | | |

Figures 4A, 4B:
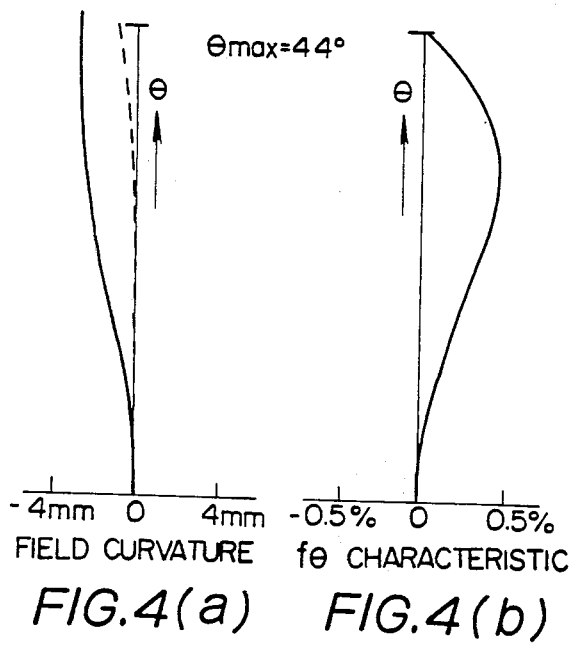

FIGS. 4a and 4b show the field curvature and $f\theta$ characteristic of this example 3.

EXAMPLE 4

| f = 100, | 1/f1 = 0.000001, | 1/f2 = 0.009 |
|---|---|---|
| | d0 = 8.57 | |
| R1 = −26.051, | d1 = 8.57, | N1 = 1.51 |
| R2 = −28.945, | d2 = 4.29, | |
| R3 = ∞ | d3 = 10.71, | N2 = 1.71 |
| R4 = −78.889 | | |

Figures 5A, 5B:
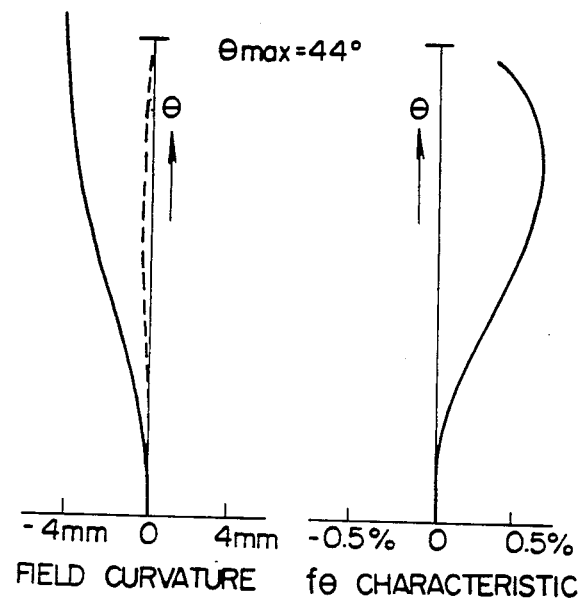

FIGS. 5a and 5b show the field curvature and the $f\theta$ characteristic of example 4.

EXAMPLE 5

| f = 100, | 1/f1 = 0.000001, | 1/f2 = 0.009 |
|---|---|---|
| | d0 = 12.86 | |
| R1 = −32.585, | d1 = 10.71, | N1 = 1.51 |
| R2 = −36.200, | d2 = 5 | |
| R3 = ∞ | d3 = 10.71, | N2 = 1.61 |
| R4 = −67.778 | | |

Figures 6A, 6B:
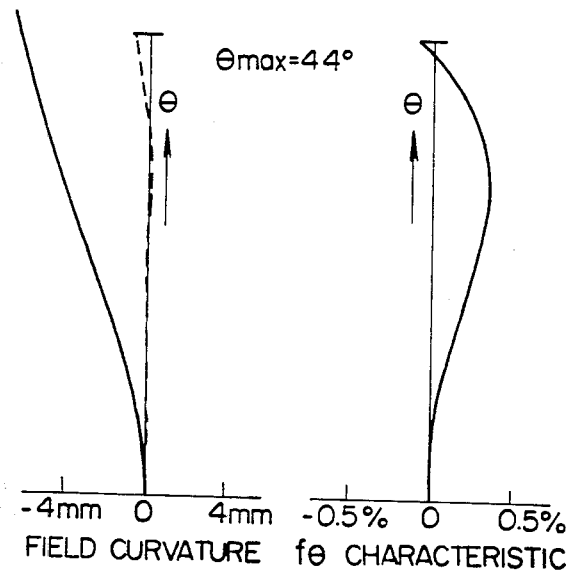

FIGS. 6a and 6b show the field curvature and $f\theta$ characteristic of example 5.

EXAMPLE 6

| f = 100, | 1/f1 = 0.001, | 1/f2 = 0.0084 |
|---|---|---|
| | d0 = 8.57 | |
| R1 = −35.907, | d1 = 8.57, | N1 = 1.51 |
| R2 = −35.728, | d2 = 4.29 | |
| R3 = ∞ | d3 = 10.71, | N2 = 1.71 |
| R4 = −84.524 | | |

FIGS. 7a and 7b show the field curvature and the $f\theta$ characteristic of example 6.

EXAMPLE 7

| f = 100, | 1/f1 = 0.001, | 1/f2 = 0.0084 |
|---|---|---|
| | d0 = 12.86 | |
| R1 = −43.539, | d1 = 10.71, | N1 = 1.51 |
| R2 = −43.448, | d2 = 5 | |
| R3 = ∞ | d3 = 10.71, | N2 = 1.61 |
| R4 = −72.619 | | |

FIGS. 8a and 8b show the field curvature and the $f\theta$ characteristic of example 7.

EXAMPLE 8

| f = 100, | 1/f1 = 0.002, | 1/f2 = 0.0078 |
|---|---|---|
| | d0 = 12.86 | |

-continued

| f = 100, | 1/f1 = 0.002, | 1/f2 = 0.0078 |
|---|---|---|
| R1 = −73.905, | d1 = 10.71, | N1 = 1.51 |
| R2 = −60.103, | d2 = 5 | |
| R3 = ∞ | d3 = 10.71, | N2 = 1.61 |
| R4 = −78.205 | | |

FIGS. 9a and 9b show the field curvature and the $f\theta$ characteristic of example 8.

As can be clearly noted from the foregoing examples, $f\theta$ lenses that satisfy the conditions (a) and (b) have excellent field curvature and $f\theta$ characteristic, and ensure a large effective deflection angle (picture angle$\times 2 = 2\theta$max). Further, such $f\theta$ lenses satisfying the conditions (a) and (b) can be located at a position close to the deflection point P shown in FIG. 1, so that the light path length between the deflection point P and a surface to be scanned can be reduced. In addition, since the lenses that constitute the $f\theta$ lens can be miniaturized, it is possible to make the light beam scanning device compact.

In the $f\theta$ lens that satisfies the conditions (a) and (b), since one surface of lens 2 is plane, a cylindrical mirror having a positive power in the sagittal direction is readily introduced so that the performance of the compensation for the wobble can be improved. More particularly, as shown in FIG. 10, by prodiving a cylindrical mirror 4 having a positive power in the sagittal direction to the rear side of the lens system shown in FIG. 1, an wobble compensating optical system can be realized. In this case, when the plane surface of lens 2 shown in FIG. 1 is made to be a concave cylindrical surface 5 having a power in the sagittal direction as shown in FIG. 10, it is possible to greatly improve the field curvature of the sagittal surface without affecting the field curvature and the $f\theta$ characteristic in the scanning direction.

It should be understood that the invention is not limited to the specific embodiments described above and that many changes and modifications can be made without departing from the true spirit and scope as defined in the appended claims.

What is claimed is:

1. An $f\theta$ lens for use in a light beam scanning device for focusing on a surface to be scanned a light beam which is deflected by deflecting means, said $f\theta$ lens comprising:
   a meniscus lens having a small power and located on the side of a deflection point which the light beam is deflected, and
   a plano-convex lens having a large power and disposed with its convex surface on the side of said surface to be scanned,
   said lenses being constructed to satisfy the following conditions:

$$-0.3 \leq f/f1 \leq 0.2 \tag{a}$$

$$-0.6/f1 + 0.85/f \leq 1/f2$$

$$1/f2 \leq -0.6/f1 + 0.95/f \tag{b}$$

where f represent a focal length of a lens system constituted by said two lenses, and $f_1$ and $f_2$ respectively represent focal lengths of the meniscus lens and the plano-convex lens.

* * * * *